United States Patent

Mailhot et al.

(10) Patent No.: US 6,798,563 B2
(45) Date of Patent: Sep. 28, 2004

(54) METHOD AND DEVICE FOR REDUCING PUMP NOISE TRANSFER IN RAMAN AMPLIFICATION

(75) Inventors: Sylvain Mailhot, Gatineau (CA); Mathieu Massé, Aylmer (CA); Haitao Sun, Ottawa (CA)

(73) Assignee: Nortel Networks Limited, St-Laurent (CA)

( * ) Notice: Subject to any disclaimer, the term of this patent is extended or adjusted under 35 U.S.C. 154(b) by 93 days.

(21) Appl. No.: 10/189,458

(22) Filed: Jul. 8, 2002

(65) Prior Publication Data

US 2004/0004754 A1 Jan. 8, 2004

(51) Int. Cl.[7] .............................................. H01S 3/00
(52) U.S. Cl. ....................................................... 359/334
(58) Field of Search ........................ 359/334; 372/38.06

(56) References Cited

U.S. PATENT DOCUMENTS

| | | | | |
|---|---|---|---|---|
| 5,347,525 A | * | 9/1994 | Faris ............................ 372/19 |
| 5,396,506 A | * | 3/1995 | Ball .............................. 372/6 |
| 5,477,368 A | * | 12/1995 | Eskildsen et al. ............ 398/147 |
| 5,566,381 A | * | 10/1996 | Korotky ....................... 398/147 |
| 5,694,408 A | * | 12/1997 | Bott et al. ..................... 372/6 |
| 6,058,128 A | * | 5/2000 | Ventrudo ...................... 372/96 |
| 6,061,170 A | * | 5/2000 | Rice et al. ................... 359/345 |
| 6,072,614 A | * | 6/2000 | Roberts ....................... 398/177 |
| 6,215,809 B1 | * | 4/2001 | Ziari et al. .................... 372/96 |
| 6,496,297 B1 | * | 12/2002 | Frankel et al. ............... 359/279 |
| 2003/0002138 A1 | * | 1/2003 | DeCusatis et al. ........... 359/334 |
| 2003/0123133 A1 | * | 7/2003 | Flannery et al. ............. 359/334 |

OTHER PUBLICATIONS

Pump to signal RIN transfer in Raman fibre amplifiers, C.R.S. Fludger, V. Handerek and R.J. Mears, Electronics letters, Jan. 4, 2001, vol. 37 No. 1.

High power, low RIN, spectrally–broadened 14 xx DFB pump for application in co–pumped Raman amplification, R.P. Espindola, K.L. Bacher, K. Kojima, N. Chand, S. Srinivasan, G.C. Cho, F. Jin, C. Fuchs, V. Milner, and W.C. Dautremont–Smith, downloaded from wttp://www.a-gere.com/enterprise metro access/docs/ecoc01–pd–final.pdf on Jun. 28, 2002.

\* cited by examiner

*Primary Examiner*—Nelson Moskowitz
*Assistant Examiner*—Deandra M. Hughes

(57) ABSTRACT

A Raman pump unit for connection to a main optical path includes a signal generator for generating a plurality of at least partially complementary dither signals, a plurality of modulators connected to said signal generator capable of receiving pump driver signals and modulating these in accordance with the dither signals and a plurality of pumps connected to the modulators for receiving producing optical pump signals from the modulated pump driver signals. The unit also includes an optical coupler connected to the plurality of pumps for introducing a combination of the optical pump signals into the main optical path. The use of pump dithering increases the spectral width of the optical pump signals being injected into the main optical path, which helps to fight the deleterious effects of SBS. Meanwhile, pump noise transfer to the main optical signal is mitigated because the signal gain is the combination of two at least partially complementary pump dither signals.

29 Claims, 3 Drawing Sheets

METHOD AND DEVICE FOR REDUCING PUMP NOISE TRANSFER IN RAMAN AMPLIFICATION

FIELD OF THE INVENTION

The present invention relates generally to optical systems and, more particularly, to a method and Raman pump unit for reducing noise transfer from a pump to a main optical signal travelling on a main optical path.

BACKGROUND OF THE INVENTION

Stimulated Brillouin Scattering (SBS) is a serious impairment in fiber optic communication systems. SBS is a nonlinear optical process that can occur in an optical fiber when a narrow spectral linewidth laser source is used to transmit optical signals. Among various nonlinear effects, the impact of SBS is by far the most severe because of the relatively low optical power at which it can occur. SBS manifest itself through the generation of a backward-propagating wave that carries a significant portion of the input signal energy (the Brillouin gain) once a certain optical power threshold (the Brillouin threshold) is reached. This process negatively impacts optical system performance by reducing the optical power received at a receiver downstream. In order to launch higher input power into the fiber, it is desirable to raise the Brillouin threshold, which can be achieved using a "source dithering" technique at a transmitter site. Basically, this technique consists of varying the intensity of a main optical signal being transmitted with a small-amplitude dither signal having frequency content in the MHz range. The net effect of this technique is to broaden the spectral linewidth of the source signal, which allows the Brillouin gain to be highly reduced and as a result eliminates the detrimental effects of SBS on optical systems.

Fiber optic communication systems are also prone to other impairments, such as signal attenuation, which are due to lengthy transmission spans. One way to combat this type of impairment, which may be used in conjunction with source dithering, is the constructive usage of the so-called Raman effect in optical fibers. Specifically, it is possible to use intrinsic properties of silica (glass) fibers to obtain signal amplification. This means that the transmission fiber can be used as a medium for amplification, allowing the attenuation of data signals transmitted over the fiber to be combated within the fiber itself. An amplifier working on the basis of this principle is commonly known as a Raman amplifier.

The physical property behind a Raman amplifier is stimulated Raman scattering (SRS, not to be confused with SBS). This occurs when a pump signal of a sufficiently high pump power is launched at a shorter wavelength (higher optical frequency) than the main optical signal to be amplified. Amplification occurs when a photon from the pump signal gives up its energy to create a new photon at the signal frequency, plus some residual energy, which is absorbed as vibrational energy. The resulting amount of gain (known as "Raman gain") thus depends strongly on the pump power and the frequency offset between the pump signal and the main optical signal. As is well known in the art, Raman amplification potentially can be achieved in every region of the transmission window of a conventional optical transmission fiber, as long as a powerful pump source is available at the required wavelength.

However, it will be noted that the pump signal used in Raman amplification is itself not immune to SBS. Therefore, techniques similar to source dithering have been applied to the reduction of SBS in Raman amplifiers. This technique is aptly named "pump dithering", in analogy to "source dithering" used for the main optical signal. Just as source dithering requires the source signal to be modulated by a low-amplitude dither signal having frequency content in the MHz range, pump dithering requires the laser drive current of the pump source to be modulated by a low-amplitude dither signal having frequency content in the MHz range. Not surprisingly, this has the effect of broadening the spectral linewidth of the pump signal, which has been found to avoid the detrimental effects of SBS arising from use of a pump signal.

The parameters of the low-amplitude dither signal used in pump dithering are typically set such that the modulated pump signal continues to perform well in the presence of SBS. Because one of the drawbacks of Raman amplification is the need for high pump powers in order to provide reasonable gain, it turns out that the "low-amplitude" dither signal used to modulate the pump signal will have a rather non-negligible power. The ultra fast response time of the Raman amplification process means that any time varying fluctuations in pump signal amplitude, phase or frequency will get transferred almost instantaneously to the main optical signal, which causes the main optical signal to feel the effects of the dithering in the pump signal. These effects are especially noticeable in the case where the pump signal and the main optical signal travel in the same direction along an optical transmission fiber (referred to as a "co-pumping" or "forward pumping" scenario).

The variations in the amplitude of the main optical signal constitute noise, which could potentially lead to corruption of the data carried by the main optical signal. Moreover, when multiple spans are involved, each utilizing Raman Amplification, the effect of source dithering on signal quality is accumulated as amplitude modulation gets transferred from each successive pump source to the main optical signal.

Against this background, it should be apparent that the need exists to provide a solution by which pump dithering for countering SBS in a Raman amplifier can continue to be practiced, while only minimally affecting the integrity of the optical signal being amplified.

SUMMARY OF THE INVENTION

According a first broad aspect, the invention provides a Raman pump unit for connection to a main optical path. The Raman pump unit includes a signal generator capable of generating a plurality of at least partially complementary dither signals, a plurality of modulators connected to the signal generator, each modulator capable of receiving a corresponding pump driver signal and modulating the corresponding pump driver signal in accordance with a corresponding one of the dither signals, a plurality of pumps connected to the plurality of modulators, each pump capable of receiving a corresponding modulated pump driver signal from a corresponding one of the modulators and producing a corresponding optical pump signal therefrom and an optical coupler connected to the plurality of pumps, the optical coupler capable of introducing a combination of the optical pump signals into the main optical path.

According to another broad aspect, the invention provides a method of modifying a main optical signal travelling on a main optical path. The method includes a step of generating a plurality of dither signals, each dither signal having a temporal variability. The method further includes the step of modulating a plurality of pump driver signals with the plurality of dither signals, respectively, to produce a respective plurality of modulated pump driver signals. The method also includes the step of producing a plurality of optical pump signals from the plurality of modulated pump driver signals, each optical pump signal having a respective spectral width. Finally, a combination of the optical pump signals are introduced into the main optical path. The dither signals are designed selected such that the combination of the optical pump signals has a greater spectral width than any of the optical pump signals in the absence of dithered and a lesser temporal variability than any of the individually dithered optical pump signals.

According to a third broad aspect, the present invention provides a signal embodied in a transmission medium. The signal includes a main optical signal having spectral content centered about a main optical wavelength and an optical pump signal having spectral content in a region occupying at least one second wavelength shorter than the first wavelength. The optical pump signal is characterized by a plurality of individual optical component signals, each individual optical component signal having spectral width and a time-varying intensity brought on by dithering a corresponding pump driver signal with a corresponding dither signal, the pump signal having a spectral width that is greater than the spectral width of any of the individual optical component signals in the absence of dither and a temporal variability that is less than the temporal variability of any of the individual optical component signals.

The present invention affords several advantages. Firstly, the use of pump dithering at the pump wavelength (or wavelengths) increases the spectral width of the combination of optical pump signals being injected into the main optical path. This spectral widening helps to fight the deleterious effects of SBS. Meanwhile, the signal gain (at the wavelength of the main optical signal) is the combination of a plurality of dithered waveforms that are at least partially complementary in time. This combination will cause in a "self-averaging" effect, which causes less pump noise to be transferred to the main optical signal.

As can be appreciated, the present invention finds application in various types of Raman amplification, such as in Distributed Raman Amplification (where the transmission fiber is used as the amplification medium) or in Discrete Raman Amplification where gain is provided to various spectral regions of the transmission window within an amplifier module.

These and other aspects and features of the present invention will now become apparent to those of ordinary skill in the art upon review of the following description of specific embodiments of the invention in conjunction with the accompanying drawings.

DETAILED DESCRIPTION OF THE PREFERRED EMBODIMENTS

Figure 1:
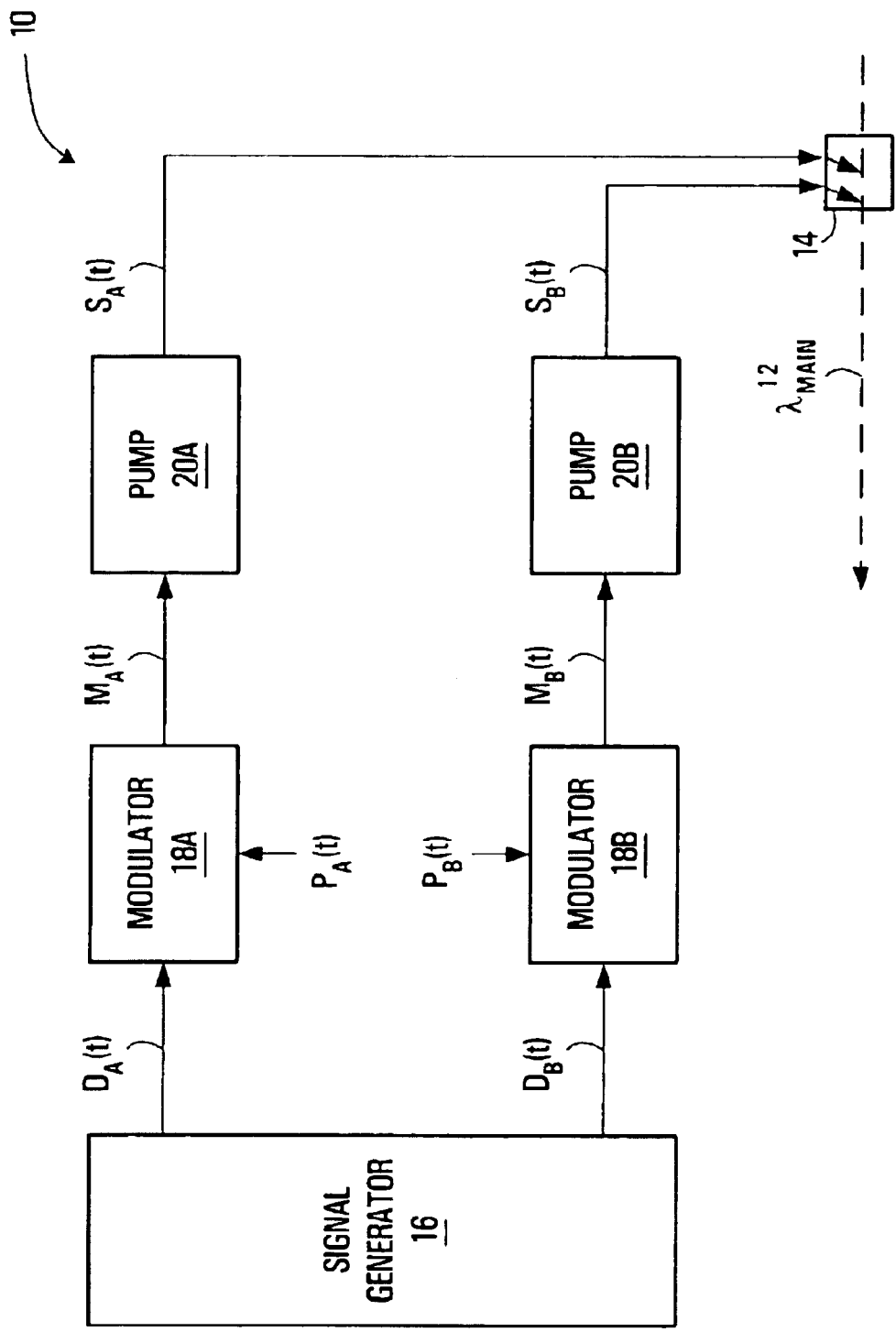
FIG. 1 is a block diagram of a Raman pump unit in accordance with an embodiment of the present invention.

With reference to FIG. 1, there is shown a Raman pump unit 10 in accordance with an embodiment of the present invention. The Raman pump unit 10 includes an optical coupler 14 which couples the Raman pump unit 10 to a main optical path 12. The main optical path 12 could be a waveguide such as an optical fiber. The main optical path 12 carries a main optical signal, which may be a single-carrier optical signal having an optical spectrum centered about a particular optical wavelength, in this case $\lambda_{main}$. In other embodiments, the main optical signal may consist of a plurality of optical carriers centered about distinct optical wavelengths. The main optical signal may travel in either direction along the main optical path 12. In the illustrated embodiment, the main optical signal is shown as traveling from right to left. Other single- or multiple-carrier signals may share the main optical path 12 and may travel in the same direction or in a direction opposite to that of the main optical signal.

The Raman pump unit 10 in this particular example includes a signal generator 16, a pair of modulators 18A, 18B and a pair of pumps 20A, 20B. The signal generator 16 is adapted to generate a pair of dither signals $D_A(t)$, $D_B(t)$, which are used by the modulators 18A, 18B in modulating a pair of corresponding pump driver signals $P_A(t)$, $P_B(t)$ that control the pumps 20A, 20B. As described in the introductory portion of this specification, pump signal dithering combats Stimulated Brillouin Scattering (SBS) by widening the spectral linewidth of the optical pump signals used in Raman amplification.

According to the present invention, the dither signals $D_A(t)$, $D_B(t)$ generated by the signal generator 16 exhibit at least partial complementarity from a temporal perspective. It is to be understood that by the term "at least partial complementarity" signifies that the dither signals would at least partly cancel one another in amplitude if they were combined temporally in a single signal.

For example, according to a first definition that is within the scope of the present invention, the dither signals $D_A(t)$, $D_B(t)$ exhibit are at least partially complementary if:

$$\int_0^T |D_A(t) - D_B(t)| dt < \int_0^T |D_A(t)| dt$$
$$< \int_0^T |D_B(t)| dt,$$

for a predetermined value of T. It will be noted that full complementarity is exhibited if:

$$\int_0^T |D_A(t) - D_B(t)| dt = 0.$$

According to a second definition that is within the scope of the present invention, the dither signals $D_A(t)$, $D_B(t)$ exhibit an at least partial degree of complementarity if:

$$\int_0^T (D_A(t) - D_B(t))^2 dt < \int_0^T (D_A(t))^2 dt$$
$$< \int_0^T (D_B(t))^2 dt,$$

for a predetermined value of T. It will be noted that full complementarity is exhibited if:

$$\int_0^T (D_A(t) - D_B(t))^2 dt = 0.$$

According to a third definition that is within the scope of the present invention, the dither signals $D_A(t)$, $D_B(t)$ exhibit at least partial complementarity if:

$$\max_{0 \le t \le T} |D_A(t) - D_B(t)| < \max_{0 \le t \le T} |D_A(t)|$$

$$< \max_{0 \le t \le T} |D_B(t)|,$$

with full complementarity being exhibited if:

$$\max_{0 \le t \le T} |D_A(t) - D_B(t)| = 0.$$

Of course, it is to be understood that still other definitions of complementarity are within the scope of the invention. Also, if more than two dither signals are used, then the term partial or full complementarity should be understood to refer to partial or full complementarity between the dither signals in each combination pair of dither signals.

Those skilled in the art will appreciate that there are many ways to design a pair of dither signals $D_A(t)$, $D_B(t)$ such that they exhibit at least partial complementarity. In a very simple, non-limiting example, the dither signal $D_A(t)$ may be a periodic square wave with a duty cycle of 50% and a period of 0.5 microseconds (or fundamental frequency of 2 MHz). Such a dither signal could be the output of conventional clock generation circuitry such as may be produced by an emitter-collector logic (ECL) driver. Upon shifting the phase of the dither signal $D_A(t)$ by 180 degrees, one obtains a suitable version of the dither signal $D_B(t)$, which is fully complementary to the dither signal $D_A(t)$. The required amount of phase shifting can be achieved by delaying a portion of the dither signal $D_A(t)$ by half of the period or by passing a portion of the dither signal $D_A(t)$ through an inverter.

It should of course be appreciated that it is well within the scope of the invention to use periodic dither signals with a duty cycle other than 50% or with a period other than 0.5 microseconds (fundamental frequency other than 2 MHz). Also, embodiments are envisaged in which the dither signal $D_A(t)$ is a non-periodic signal, such as a pseudo-random data sequence. In general, the dither signals $D_A(t)$, $D_B(t)$ can take on any pair of waveforms, as long as there exists some degree of complementarity between the two waveforms, i.e., as long as there is a temporal averaging effect, which can be described as the condition where the superposition of the two dither signals has a smaller amplitude and/or a smaller energy and/or a smaller "area under the curve" than either of the dither signals themselves.

Optionally, the signal generator 16 may provide conditioning of the dither signals $D_A(t)$, $D_B(t)$ to ensure that the electrical frequency content of these signals is within a desired range. For example, the signal generator 16 may include suitable filtering circuitry for this purpose.

With continued reference to FIG. 1, each of the modulators 18A, 18B receives a respective one of the dither signals from the signal generator 16. Thus, modulator 18A receives dither signal $D_A(t)$ and modulator 18B receives dither signal $D_B(t)$. Each of the modulators 18A, 18B also receives a corresponding pump driver signal $P_A(t)$, $P_B(t)$ from a pump driver signal source (not shown). A pump driver signal represents the signal which, once converted and modulated, will be injected into the main optical path 12 in order to provide Raman amplification. Typically, the pump driver signals $P_A(t)$ and $P_B(t)$ are constant signals of the same level, although persons skilled in the art will appreciate that they need not be constant signals or have the same level.

Modulator 18A functions by modulating the received pump driver signal $P_A(t)$ with the dither signal $D_A(t)$, in order to produce a modulated pump driver signal $M_A(t)$. Similarly, modulator 18B functions by modulating the received pump driver signal $P_B(t)$ with the dither signal $D_B(t)$, in order to produce a modulated pump driver signal MB(t). One suitable mathematical description of the modulation process is as follows:

$$M_j(t) = P_j(t)[1 + k_j * D_j(t)], j \in \{A, B\},$$

where $k_A$ and $k_B$, both of which could be equal, are known as the "modulation depth" respectively associated with each of the modulators 18A, 18B.

Each of the modulators 18A, 18B supplies its respective modulated pump driver signal $M_A(t)$, $M_B(t)$, to a respective pump 20A, 20B. Each of the pumps 20A, 20B utilizes a laser source to produce a respective optical pump signal $S_A(t)$, $S_B(t)$ at a particular optical wavelength having an intensity that varies as a function of a the instantaneous level of the corresponding received modulated pump driver signal $M_A(t)$, $M_B(t)$. In the illustrated embodiment, both pumps 20A, 20B use the same the pump wavelength, denoted $\lambda_{pump}$, although this need not be the case in other embodiments. Those skilled in the art will be capable of making an appropriate choice of the pump wavelength $\lambda_{pump}$ as a function of the optical carrier(s) in the main optical signal—in this case $\lambda_{main}$.

The coupler 14 combinedly introduces the optical pump signals $S_A(t)$, $S_B(t)$ into the main optical path 12. An explicit combination of the optical pump signals may be produced prior to introduction of this combined signed into the main optical path 12, or they may be introduced directly into the main optical path 12.

The optical pump signals $S_A(t)$, $S_B(t)$ are sent into the main optical path 12 in either of two directions, namely either in a direction that is the same as the direction of travel of the main optical signal (co-pumping or forward pumping) or in a direction that is opposite to the direction of travel of the main optical signal (counter-pumping or backward pumping). Typically, as has been explained, the problems related to pump noise transfer are more severe in the co-pumping case due to the high cross-talk between the various signals traveling in the same direction. Therefore, the present invention is particularly advantageous in a co-pumping configuration (as illustrated), although it may also find application to the counter-pumping configuration (not shown in FIG. 1).

In operation, modulation of a pump driver signal with a dither signal results in widening of the spectral linewidth of the resulting optical pump signal. More specifically, each of the pumps 20A, 20B produces a signal that will occupy a nominal optical wavelength of $\lambda_{pump}$ and have an instantaneous intensity controlled by the instantaneous level of the pump driver signal. Due to nonlinear effects in the pump lasing process, a variation in the level of the pump driver signal will not only cause a corresponding variation in the intensity of the optical pump signal, but will also cause a shift of the wavelength at which lasing occurs, such that the power spectral density of the resulting optical pump signal will extend to optical wavelengths on either side of $\lambda_{pump}$ in the optical spectrum.

However, this wavelength shift is random, so that for two different pumps faced with the same modulated pump driver signal, the variation in the intensity of each resulting optical pump signal will be the same, whereas the shift in wavelength will be uncorrelated. It follows that if the two pumps 20A, 20B in the Raman pump unit 10 are faced with complementarily modulated pump driver signals, the variation in the intensity of each resulting optical pump signal $S_A(t)$, $S_B(t)$ is complementary, while the deviation in wavelength of each resulting optical pump signal $S_A(t)$, $S_B(t)$ is still uncorrelated. This leads to the conclusion that combining the optical pump signals $S_A(t)$, $S_B(t)$ will yield a composite signal C(t) which contains a broadened optical spectrum resulting from the combination of two random wavelength deviations, as well as an "averaged out" intensity, since the temporal variations in the optical pump signal $S_A(t)$, $S_B(t)$ will be cancelled to a degree that is directly related to the degree of complementarity between the dither signals $D_A(t)$ and $D_B(t)$. This allows SBS to be combated by virtue of increased spectral linewidth, while residual dither in the main optical signal due to pump noise transfer is minimized.

In general, the greater the modulation depth $k_A$ and $k_B$, the more the spectral linewidth of the optical pump signals generated by the pumps 20A, 20B will be broadened. However, also associated with greater modulation depth is the onset of a greater amount of residual dither in the main optical signal if the dither signals $D_A(t)$, $D_B(t)$ are not fully complementary. System designers will thus be called upon to determine a suitable range of modulation depths for satisfying the operational requirements of a particular embodiment.

It will also be appreciated that if the lasers used in the pumps 20A, 20B operate at the same optical wavelength $\lambda_{pump}$ and have the same electrical-to-optical transfer function (electrical-optical efficiency of pump laser L-I curve), then full complementarity in the modulated signals $M_A(t)$ and $M_B(t)$ would result in zero residual dither in the composite optical pump signal C(t) that reaches the main optical signal. In a non-ideal case, the pump laser efficiency for pump 20A and pump 20B will differ slightly and therefore slightly above-zero residual time-domain dither will remain, although this will be less than the dither of either dither signal alone.

It will of course be understood that myriad variations of the above described embodiment are possible. For instance, each of the pumps 20A, 20B may operate at a different pump wavelengths. This may be useful when providing Raman amplification over a broad band of optical frequencies. If this is indeed the case, then a similar architecture to that shown in FIG. 1 may be used, although with different pump wavelengths for each of the pumps 20A, 20B. However, this scenario, while advantageous, may not result in as great a reduction of noise transfer as in the case where the same pump wavelength $\lambda_{pump}$ is used. This is because each pump will be acting on a different spectral region of the amplification window, which will prevent the optical pump signals from "averaging out" in time domain.

Figure 2:
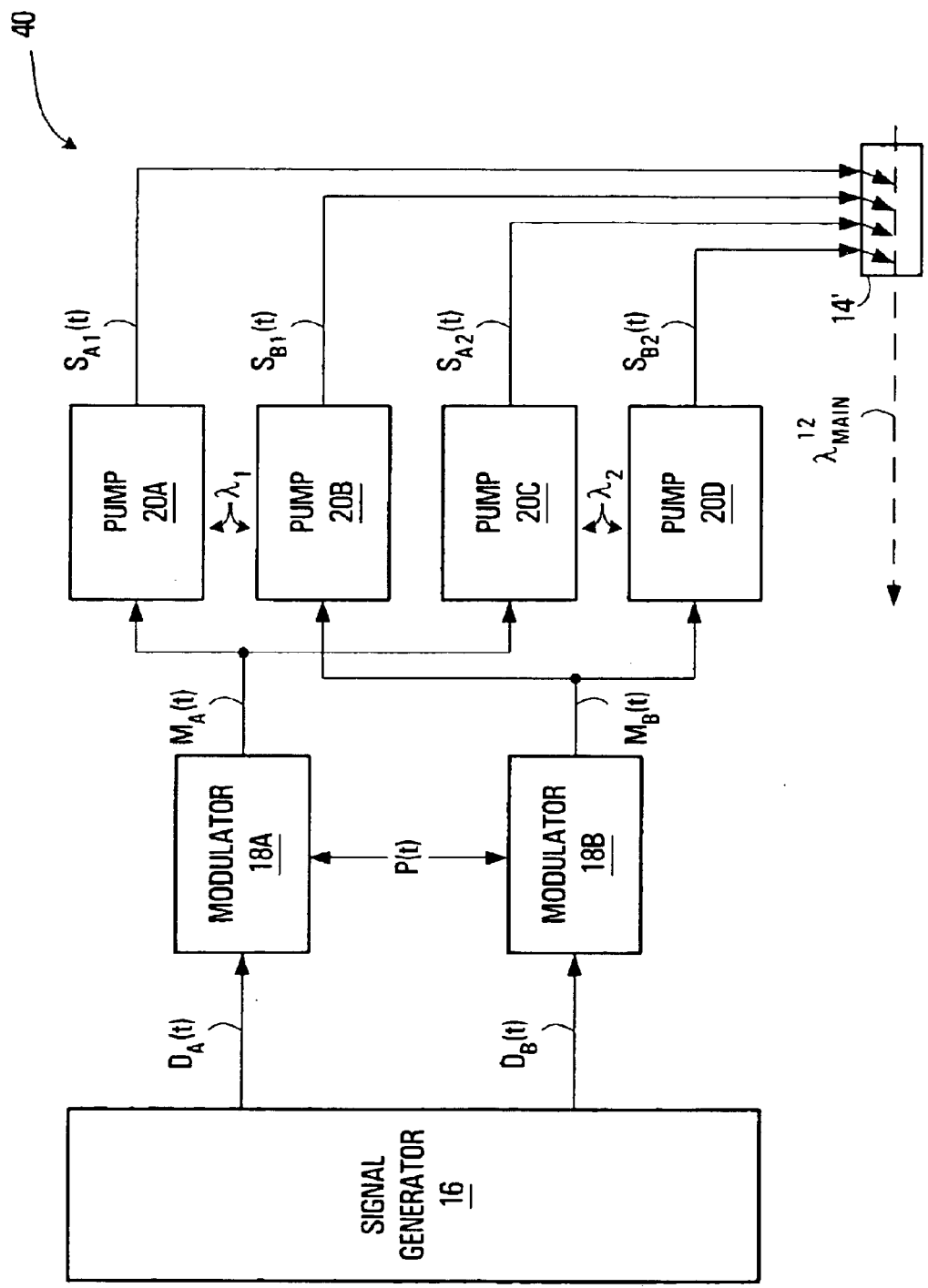
FIG. 2 is a block diagram of a Raman pump unit in accordance with another embodiment of the present invention.

With reference now to FIG. 2, there is shown a Raman pump unit 40 which is similar to the Raman pump unit 10 of FIG. 1, with the notable exception that it includes twice the number of pumps 20A, 20B, 20C, 20D. As previously described, the signal generator 16 generates the at least partially complementary dither signals $D_A(t)$, $D_B(t)$, which are supplied to modulators 18A and 18B, respectively. In this example, both modulators 18A, 18B receive a common pump driver signal P(t). Modulator 18A modulates the pump driver signal P(t) with dither signal $D_A(t)$ to produce modulated pump driver signal $M_A(t)$, which is supplied to pumps 20A and 20C. Similarly, modulator 18B modulates the pump driver signal P(t) with dither signal $D_B(t)$ to produce modulated pump driver signal $M_B(t)$, which is supplied to pumps 20B and 20D.

Pumps 20A and 20B operate at a pump optical wavelength $\lambda 1$, while pumps 20C and 20D operate at a pump optical wavelength $\lambda 2$. Thus, pump 20A produces an optical pump signal $S_{A1}(t)$ at wavelength $\lambda 1$ based on dither signal $D_A(t)$, pump 20B produces an optical pump signal $S_{B1}(t)$ at wavelength $\lambda 1$ based on dither signal $D_B(t)$, pump 20C produces an optical pump signal $S_{A2}(t)$ at wavelength $\lambda 2$ based on dither signal $D_A(t)$ and pump 20D produces an optical pump signal $S_{B2}(t)$ at wavelength $\lambda 2$ based on dither signal $D_B(t)$. The optical pump signals $S_{A1}(t)$, $S_{B1}(t)$, $S_{A2}(t)$, $S_{B2}(t)$ are provided to respective inputs of an optical coupler 14', which introduces the optical pump signals into the main optical path 12.

In this embodiment, it is seen that the four optical pump signals introduced into the main optical path 12 by the coupler 14 include signals characterized by four different combinations of two possible optical frequencies and two possible dither signals. The use of multiple pump optical wavelengths can provide an improvement in broadband performance of the Raman pump unit 40 vis-à-vis a single-pump-optical-wavelength approach, while retaining the advantages of reducing pump noise transfer due to at least partial complementarity of the dither signals. Of course, it should be appreciated that a greater number of pump optical wavelengths could be used and, moreover, it may be advantageous to use a separate complementary pair of dither signals for each pump optical wavelength.

Figure 3:
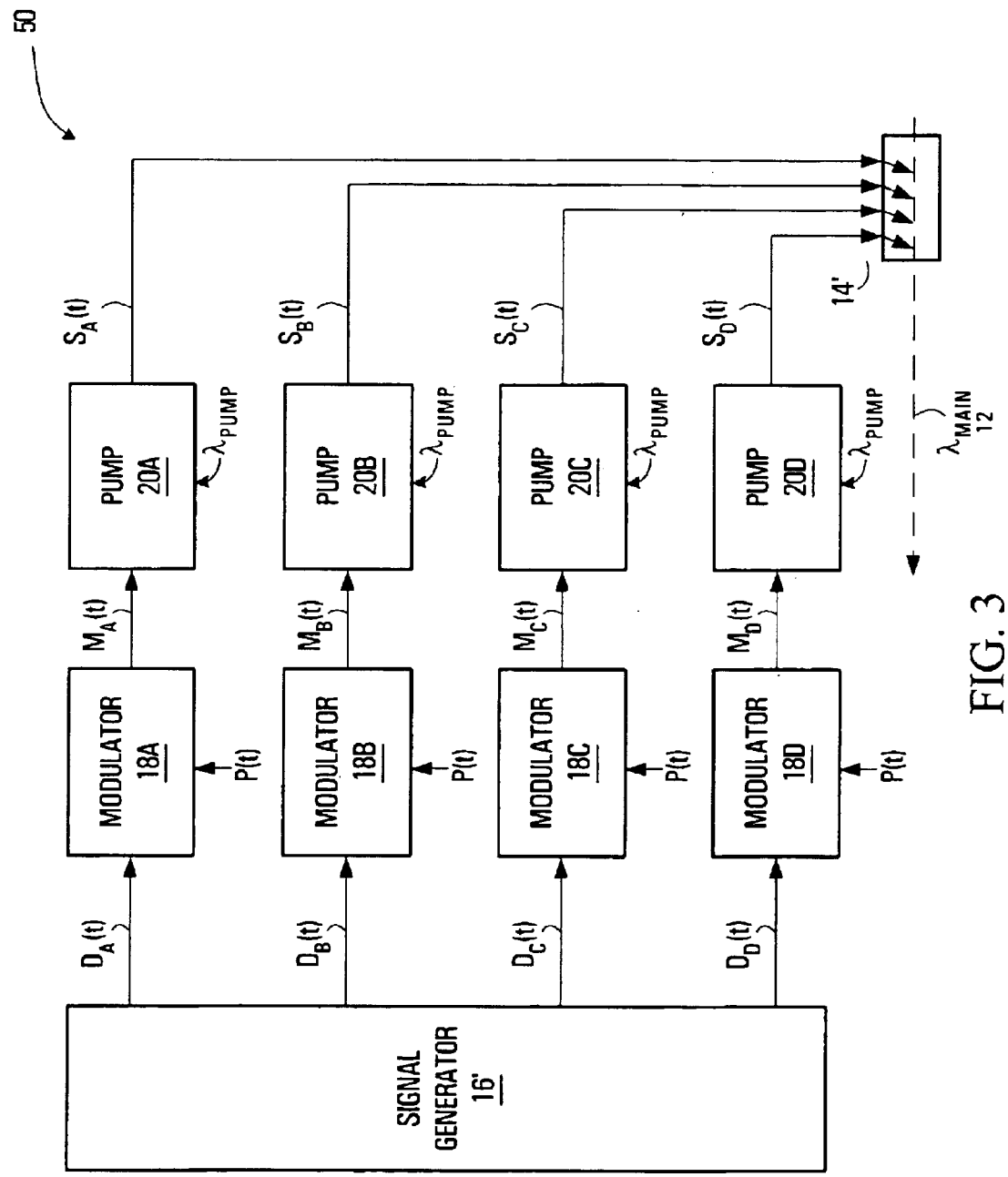
FIG. 3 is a block diagram of a Raman pump unit in accordance with another embodiment of the present invention.

With reference to FIG. 3, there is shown a Raman pump unit 50 which is similar to the Raman pump unit 40 of FIG. 2, with the notable structural difference that the Raman pump unit 50 includes twice the number of modulators 18A, 18B, 18C, 18D for handling twice the number of dither signals $D_A(t)$, $D_B(t)$, $D_C(t)$, $D_D(t)$ produced by signal generator 16'. The dither signals are at least partially complementary, which means that for each pair of dither signals, the two dither signals in that pair exhibit at least partial complementarity. This could be implemented, for example, by letting dither signals $D_B(t)$, $D_C(t)$ and $D_D(t)$ be 90-, 180- and 270-degree phase shifted versions of a periodic "master" dither signal $D_A(t)$, respectively.

In this example, the four modulators 18A, 18B, 18C, 18D receive a common pump driver signal P(t). Modulator 18A modulates the pump driver signal P(t) with dither signal $D_A(t)$ to produce modulated pump driver signal $M_A(t)$, which is supplied to pump 20A. Similarly, modulator 18B modulates the pump driver signal P(t) with dither signal $D_B(t)$ to produce modulated pump driver signal $M_B(t)$, which is supplied to pump 20B. Also, modulator 18C modulates the pump driver signal P(t) with dither signal $D_C(t)$ to produce modulated pump driver signal $M_C(t)$, which is supplied to pump 20C. Finally, modulator 18D modulates the pump driver signal P(t) with dither signal $D_D(t)$ to produce modulated pump driver signal $M_D(t)$, which is supplied to pump 20D.

Each of the pumps 20A, 20B, 20C and 20D operates at a common pump optical wavelength $\lambda_{pump}$. Thus, pump 20A produces an optical pump signal $S_A(t)$ at wavelength $\lambda_{pump}$ based on dither signal $D_A(t)$, pump 20B produces an optical pump signal $S_B(t)$ at wavelength $\lambda_{pump}$ based on dither signal $D_B(t)$, pump 20C produces an optical pump signal $S_C(t)$ at wavelength $\lambda_{pump}$ based on dither signal $D_C(t)$ and pump 20D produces an optical pump signal $S_D(t)$ at wavelength $\lambda_{pump}$ based on dither signal $D_B(t)$. The optical pump signals $S_A(t)$, $S_B(t)$, $S_C(t)$, $S_D(t)$ are provided to respective inputs of optical coupler 14', which introduces the optical pump signals into the main optical path 12. The use of more than two dither signals can provide an improvement in performance of the Raman pump unit 50 under certain circumstances, while retaining the advantages of reducing pump noise transfer due to at least partial complementarity of the dither signals.

Those skilled in the art will therefore appreciate that the present invention provides a method by which a main optical signal travelling on a main optical path is pumped. Specifically, by generating a plurality of dither signals, each dither signal having a temporal variability, and using the dither signals to modulate a set of pump driver signals, one is able to produce optical pump signals that have properties which are beneficial to the reduction of SBS, while at the same time reducing the impact on the signal being amplified. This will be true if the dithered optical pump signals are such that a resulting composite pump signal formed from all of the individual dithered optical pump signals has at least as wide an optical spectrum as any of the individual optical pump signals and a lower temporal variability than any of the dithered optical pump signals if taken individually.

While specific embodiments of the present invention have been described and illustrated, it will be apparent to those skilled in the art that numerous modifications and variations can be made without departing from the scope of the invention as defined in the appended claims.

We claim:

1. A Raman pump unit for connection to a main optical path, comprising:
    a signal generator capable of generating a plurality of at least partially complementary dither signals;
    a plurality of modulators connected to said signal generator, each said modulator capable of receiving a corresponding pump driver signal and modulating the corresponding pump driver signal in accordance with a corresponding one of the dither signals;
    a plurality of pumps connected to said plurality of modulators, each said pump capable of receiving a corresponding modulated pump driver signal from a corresponding one of said modulators and producing a corresponding optical pump signal therefrom; and
    an optical coupler connected to said plurality of pumps, said optical coupler capable of introducing a combination of the optical pump signals into the main optical path.

2. A Raman pump unit as defined in claim 1, wherein the dither signals are periodic.

3. A Raman pump unit as defined in claim 2, wherein at least one of the dither signals is approximately a square wave.

4. A Raman pump unit as defined in claim 2, wherein the signal generator includes an ECL driver.

5. A Raman pump unit as defined in claim 2, wherein the number of dither signals is two and wherein said two dither signals are out of phase by approximately 180 degrees.

6. A Raman pump unit as defined in claim 2, wherein the number of dither signals is two and wherein one of said two dither signals is an electrically inverted version of the other of said two dither signals.

7. A Raman pump unit as defined in claim 1, wherein at least one of the dither signals is non-periodic.

8. A Raman pump unit as defined in claim 1, wherein at least one of the dither signals is a pseudo-random data sequence.

9. A Raman pump unit as defined in claim 1, wherein the number of dither signals is two and wherein said two dither signals are fully complementary.

10. A Raman pump unit as defined in claim 1, wherein each of said modulators is an amplitude modulator.

11. A Raman pump unit as defined in claim 1, wherein at least two of said modulators modulate the same pump driver signal.

12. A Raman pump unit as defined in claim 1, wherein at least two optical pump signals produced by respective ones of said pumps have spectral content centered about a common pump optical wavelength.

13. A Raman pump unit as defined in claim 1, wherein at least two optical pump signals produced by respective ones of said pumps have spectral content centered about a distinct pump optical wavelengths.

14. A Raman pump unit as defined in claim 1, wherein at least two optical pump signals produced by respective ones of said pumps have non-overlapping spectral content.

15. A Raman pump unit as defined in claim 1, wherein the main optical path carries a main optical signal, wherein main optical signal has spectral content centered about a main optical wavelength and wherein each of the optical pump signals has spectral content centered about a corresponding pump optical wavelength that is shorter than the main optical wavelength.

16. A Raman pump unit as defined in claim 1, wherein each modulator is connected to more than one corresponding pump and wherein the pumps connected to a common modulator produce optical pump signals having optical spectral content at distinct optical wavelengths.

17. A Raman pump unit as defined in claim 1, wherein the main optical path carries a main optical signal in a direction of travel, and wherein said optical coupler is adapted to introduce the optical pump signals into the main optical path in a direction that is the same as the direction of travel of the main optical signal.

18. A Raman pump unit as defined in claim 1, wherein the main optical path carries a main optical signal in a direction of travel, and wherein said optical coupler is adapted to introduce the optical pump signals into the main optical path in a direction that is opposite to the direction of travel of the main optical signal.

19. A Raman pump unit as defined in claim 1, said modulators including at least two first modulators and at least two second modulators, the pump driver signals including at least two first pump driver signals and at least two second pump driver signals, said pumps including at least two first pumps and at least two second pumps, the optical pump signals including at least two optical pump signals having spectral content centered about a common first pump optical wavelength and at least two second optical pump signals having spectral content centered about a common second pump optical wavelength distinct from the common first pump optical wavelength.

20. A Raman pump unit as defined in claim 1, the dither signals including at least three dither signals, said modulators including at least three modulators, the pump driver signals including at least three pump driver signals, said pumps including at least three pumps, the optical pump signals including at least three optical pump signals each having spectral content centered about a common pump optical wavelength.

21. A Raman pump unit as defined in claim 1, wherein the at least three dither signals are phase-offset versions of a common periodic dither signal.

22. A Raman pump unit as defined in claim 2, wherein the number of dither signals is N and wherein the dither signals in each combination pair of dither signals are phase-offset by a multiple of 360/N degrees.

23. A Raman pump unit as defined in claim 1, said modulators including at least three first modulators and at least three second modulators, the pump driver signals including at least three first pump driver signals and at least three second pump driver signals, said pumps including at least three first pumps and at least three second pumps, the optical pump signals including at least three optical pump signals having spectral content centered about a common first pump optical wavelength and at least three second optical pump signals having spectral content centered about a common second pump optical wavelength distinct from the common first pump optical wavelength.

24. An optical transmission system, comprising:
   an optical waveguide defining a main optical path for a main optical signal;
   a Raman pump unit as defined in claim 1, coupled to the main optical path via the optical coupler of the Raman pump unit.

25. A Raman pump unit for connection to a main optical path, comprising:
   means for generating a plurality of at least partially complementary dither signals;
   means for receiving a plurality of pump driver signals and modulating the pump driver signals with corresponding ones of the dither signals, thereby to produce a corresponding plurality of modulated pump driver signals;
   means for producing a plurality of optical pump signals from the modulated pump driver signals; and
   means for introducing a combination of the optical pump signals into the main optical path.

26. A method of modifying a main optical signal travelling on a main optical path, comprising:
   generating a plurality of dither signals;
   modulating a plurality of pump driver signals with the plurality of dither signals, respectively, to produce a respective plurality of modulated pump driver signals;
   producing a plurality of optical pump signals from the plurality of modulated pump driver signals, each optical pump signal having a respective spectral width and temporal variability;
   introducing a combination of the optical pump signals into the main optical path;
   said dither signals being such that the combination of the optical pump signals has a greater spectral width than any of the individual optical pump signals in the absence of dither and a lesser temporal variability than any of the individual optical pump signals.

27. A method as defined in claim 26, said dither signals exhibiting at least partial temporal complementarity.

28. A method as defined in claim 26, said dither signals exhibiting full temporal complementarity.

29. A signal embodied in a transmission medium, comprising:
   a main optical signal having spectral content centered about a main optical wavelength; and
   an optical pump signal having spectral content in a region occupying at least one second wavelength shorter than the first wavelength, wherein the optical pump signal is characterized by a plurality of optical component signals, each optical component signal having a spectral width and a time-varying intensity brought on by dithering a corresponding pump driver signal with a corresponding dither signal, the optical pump signal having a spectral width that is greater than the spectral width of any of the optical component signals in the absence of dither and a temporal variability that is less than the temporal variability of any of the optical component signals.

* * * * *